US 9,512,917 B2

(12) United States Patent
Rozycki et al.

(10) Patent No.: US 9,512,917 B2
(45) Date of Patent: Dec. 6, 2016

(54) SPEED CONTROL SYSTEM FOR HYDROSTATIC TRANSMISSION

(71) Applicant: DANFOSS POWER SOLUTIONS INC., Ames, IA (US)

(72) Inventors: Frank J. Rozycki, Colo, IA (US); Simon L. Nielsen, Ames, IA (US); Gary R. LaFayette, Saint Joseph, MI (US)

(73) Assignee: DANFOSS POWER SOLUTIONS INC., Ames, IA (US)

( * ) Notice: Subject to any disclaimer, the term of this patent is extended or adjusted under 35 U.S.C. 154(b) by 129 days.

(21) Appl. No.: 14/302,115

(22) Filed: Jun. 11, 2014

(65) Prior Publication Data

US 2014/0372001 A1 Dec. 18, 2014

Related U.S. Application Data

(60) Provisional application No. 61/834,920, filed on Jun. 14, 2013.

(51) Int. Cl.

| F16H 61/4008 | (2010.01) |
| F16H 61/4157 | (2010.01) |
| F16H 61/42 | (2010.01) |
| F16H 61/4017 | (2010.01) |
| F16H 61/423 | (2010.01) |
| F16H 61/433 | (2010.01) |
| F16H 61/421 | (2010.01) |

(52) U.S. Cl.
CPC .......... *F16H 61/42* (2013.01); *F16H 61/4017* (2013.01); *F16H 61/4157* (2013.01); *F16H 61/421* (2013.01); *F16H 61/423* (2013.01); *F16H 61/433* (2013.01)

(58) Field of Classification Search
CPC .. F16H 61/42; F16H 61/4017; F16H 61/4157; F16H 61/4008
See application file for complete search history.

(56) References Cited

U.S. PATENT DOCUMENTS

| 5,121,603 A | 6/1992 | Wiedemann |
| 6,338,247 B1 * | 1/2002 | Drin ........................ B60T 1/093 60/466 |

(Continued)

OTHER PUBLICATIONS

Saver Danfoss; "Axial Piston Pump 115/130, 1471165, ISL Integrated Speed Limitation, Technical Information;" Jan. 2013; pp. cover p. -40, Sauer Danfoss.

(Continued)

*Primary Examiner* — Jacob S Scott
*Assistant Examiner* — Tinh Dang
(74) *Attorney, Agent, or Firm* — Zarley Law Firm, P.L.C.

(57) ABSTRACT

A speed control system for a hydrostatic transmission includes an engine having a drive shaft connected to a hydraulic pump. At least one hydrostatic motor is connected to the pump in a closed circuit by a flow line. Connected to the motor via a system shaft is a vehicle system. A controller is connected to a plurality of sensors and a proportional high pressure relief valve that is connected to the flow line between the pump and the motor. Based on information received from the sensors, the controller sets the pressure relief valve to limit the pressure to a valve that will not over-speed the engine and allows the demands of the speed control system to be attained. This may be accomplished through the use of various algorithms.

10 Claims, 2 Drawing Sheets

(56) References Cited

U.S. PATENT DOCUMENTS

| | | | |
|---|---|---|---|
| 6,360,537 B1 * | 3/2002 | Widemann | F16H 61/4035 60/451 |
| 7,121,297 B2 | 10/2006 | Thoms | |
| 7,201,183 B2 | 4/2007 | Thoms | |
| 7,693,642 B2 * | 4/2010 | Anderson | B60K 6/12 701/50 |
| 7,874,153 B2 * | 1/2011 | Behm | B60W 10/196 60/464 |

OTHER PUBLICATIONS

Sauer Dan Foss; "IBF Integrated Brake Function;" Feb. 2004; pp. 1-2, Sauer Danfoss.

* cited by examiner

SPEED CONTROL SYSTEM FOR HYDROSTATIC TRANSMISSION

CROSS REFERENCE TO RELATED APPLICATION

This application claims the benefit of U.S. Provisional Application No. 61/834,920 filed Jun. 14, 2013.

BACKGROUND OF THE INVENTION

This invention is directed to a speed control system for hydrostatic drives and particularly to speed control systems that have insufficient engine braking power to provide braking to the system or limit the amount of engine over-speed.

Systems for controlling speed and in hydrostatic drives with insufficient braking power are known in the art. As an example, an integrated speed limiter (ISL) consists of a pilot pressure setting and bypass orifice acting with a pressure reducing valve to automatically limit the pump torque input to the engine. Excess hydrostatic power is converted to heat. In these systems, the pressure reduction of oil occurs inline between the pump and motor rotating kits. Oil passes through the pressure reducing valve and into the pump rotating kit. Examples include U.S. Pat. Nos. 7,201,183; 7,121,297; 6,360,537; 6,338,247 and 5,121,603.

Similarly, systems which function based on an operator brake input device with microcontroller for systems with insufficient engine braking power are known in the art. For example, U.S. Pat. No. 7,874,153 teaches a system where motors swivel out proportionally to brake pedal travel and braking takes place by means of diesel engine drag torque with secondary force applied via pressure relief valves. In this system, the flow path of the pressure reduction is different than the previous example (i.e., ISL). The pressure relief consumes a portion of the flow being transmitted from the motor. This flow bypasses the pump rotating kit to the low pressure side of the circuit.

While helpful, these systems do not address the need for a system which functions automatically (with or without operator input) and is controlled and configured by a microcontroller. Needed is a system with maximum and immediate utilization of available drag torque possible when demanded, with or without operator input from a control lever, brake input device, or some other physical device. Also needed is a system which can automatically transition to a condition where vehicle braking can exceed the engine's capability.

An objective of the present invention is to provide a speed control system for a hydrostatic transmission that automatically adjusts speed through use of a microcontroller.

Another objective of the present invention is to provide a speed control system for a hydrostatic transmission that immediately maximizes the use of available drag torque when demanded and can provide immediate braking beyond the capability of the engine with no delay.

These and other objectives will be apparent to one of ordinary skill in the art based upon the following written description, drawings and claims.

SUMMARY OF THE INVENTION

A speed control system for a hydrostatic transmission includes an engine having a drive shaft connected to at least one hydraulic pump. At least one hydrostatic motor is connected to the pump in a closed circuit by a flow line. Connected to the motor via a system shaft is a vehicle system.

A controller is connected to a plurality of sensors and a proportional high pressure relief valve that is connected to the flow line between the pump and the motor. Based on information received from the sensors, the controller sets the pressure relief valve to limit the pressure to a value that will not over-speed the engine. This may be accomplished through the use of various algorithms.

DETAILED DESCRIPTION OF THE PREFERRED EMBODIMENTS

Figure 1:
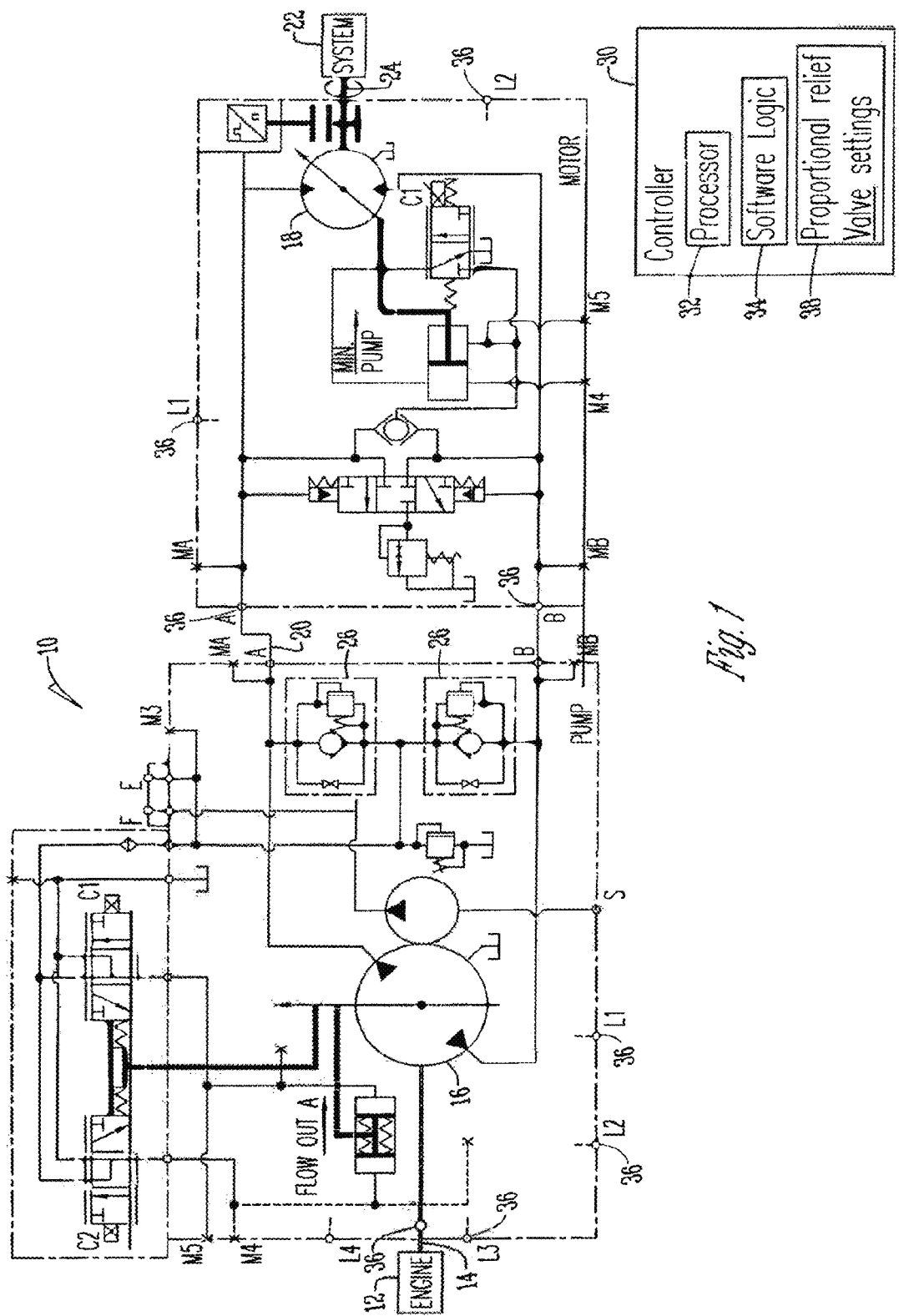
FIG. 1 is a schematic view of a speed control system.
Figure 2:
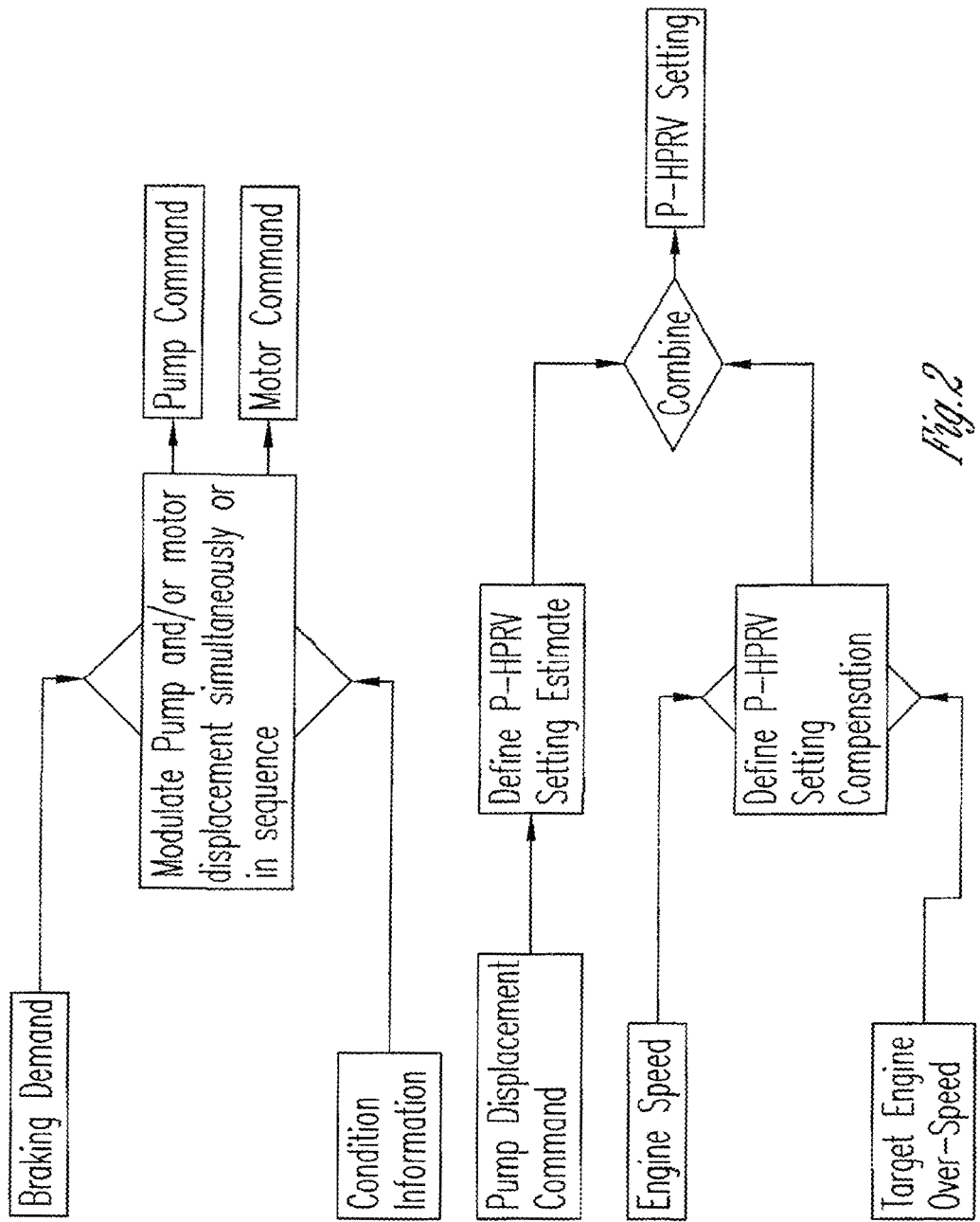
FIG. 2 is a flow diagram of system with a proportional relief valve.

Referring to the Figures, the speed control system 10 is set forth in the schematic diagrams of FIG. 1. Generally, the system 10 includes an engine 12 having a drive shaft 14 connected to a hydraulic pump 16. The hydraulic pump 16 may be a fixed displacement pump, preferred is a variable displacement pump. The hydraulic pump 16 is connected to one or more hydraulic motors 18 in a closed circuit by a flow line 20. The hydraulic motors 18 may be fixed or variable displacement motors. The hydraulic motor(s) 18 are connected to a system 22, such as a vehicle system 22, by a system shaft 24.

Connected to the flow line 20, between the hydraulic pump 16 and the hydraulic motor 18, is one or more proportional high pressure relief valves 26. The proportional high pressure relief valves 26 may or may not be direct acting, Further, the proportional high pressure relief valves 26 are positioned within the circuit such that the flow path of fluid energy conversion passes over the relief valve 26 with a proportional setting and bypasses the rotating kit, flowing to the low pressure side of the circuit.

Connected to the circuit is a controller 30 having a processor 32 that operates software logic 34. The controller 30 is also connected to a plurality of sensors 36. The sensors are positioned to detect engine speed and may also include engine load, system speed, differential pressure across the pump and the like. Other signals might be engine percent load at speed, the engine percent load, the engine speed error which is a set point minus actual, the system speed command, the process requirements such as a process speed control, differential pressure across the pump, or a software error.

In this embodiment, when braking is demanded of the speed control system 10, the controller 30 commands the pump 16 to a lower displacement and/or the motor(s) 18 to an increasing displacement. To protect the engine 12 from over-speed, a proportional high pressure relief valve 26 on the high pressure braking side of the hydrostatic circuit/loop controls the pressure. Any flow through the proportional high pressure relief valve 26 flows to the low pressure side of the circuit.

The pressure relief valve 26 is set to limit the pressure to a value that will not over-speed the engine 12. The preferred method of setting the relief valve setting 38 is to limit the pressure to a value which would cause a slightly unacceptable engine over-speed based on the current pump displacement. Using the actual engine speed as feedback, the proportional relief valve setting 38 is fine-tuned to the exact value needed for the desired amount of engine over-speed.

The motors 18 will vary displacement to meet the demands of the speed control system. If the demand for braking exceeds the engine's 12 available brake torque, the motor(s) 18 will increase displacement and produce more flow than can be consumed by the pump 16. Alternatively, or in sequence, the pump 16 can be destroked, and the relief valve setting increased. Again, when the demand for braking exceeds the engine's 12 available brake power, the reduced displacement will cause flow to occur over the relief valve 26. The lower pump displacement allows a higher proportional high pressure relief valve setting 38 to be defined simultaneously. Any excess flow is relieved over the proportional high pressure relief valve 26, allowing for energy to be converted to heat. The total braking power available to the transmission consists of brake power consumed by the engine and total leakage across the loop, along with other inefficiencies that typically occur. The flow across the proportional high pressure relief valve 26 is a significant flow across the loop and provides a significant source of power conversion to heat.

Since the proportional high pressure relief valve 26 regulates the pressure, there is nearly no delay time from pump 16 or motor 18 stroking time to achieve braking greater than the engine 12 can support. The excess braking capability or amount beyond the engine's 12 capability has no delay to begin, but will increase in magnitude as demanded by the speed control system 10.

What is claimed:

1. A speed control system, comprising:
   an engine having a drive shaft connected to at least one hydraulic pump;
   at least one hydraulic motor connected to the hydraulic pump in a closed circuit by a flow line;
   a vehicle system connected to the at least one hydraulic motor by a system shaft;
   at least one proportional high pressure relief valve connected to the flow line between the hydraulic pump and the hydraulic motor;
   a controller having a processor to operate software logic connected to the closed circuit and a plurality of sensors that detect at least engine speed;
   wherein the pressure relief valve is set by the controller based upon the sensed engine speed to a relief value that will not over-speed the engine.

2. The system of claim 1 wherein the controller commands the pump to a lower displacement and the at least one motor to a higher displacement simultaneously when a braking demand is provided by the vehicle system.

3. The system of claim 1 wherein the controller commands the pump to a lower displacement and the at least one motor to a higher displacement in sequence when a braking demand is provided by the vehicle system.

4. The system of claim 1 wherein the at least one proportional high pressure relief valve is positioned within the closed circuit such that a flow path of a fluid energy conversion by-passes the at least one proportional high pressure relief valve with a proportional setting flowing to a low pressure side of the closed circuit.

5. The system of claim 1 wherein a proportional high pressure relief valve is set to limit the pressure to a value that causes an unacceptable engine over-speed based on a current pump displacement.

6. The system of claim 1 wherein the proportional high pressure relief valve setting is adjusted by using the actual engine speed.

7. The system of claim 1 wherein the braking capability is increased beyond the engine's available braking power by increasing motor displacement.

8. The system of claim 1 wherein the braking capability is increased beyond the engine's available braking power by decreasing pump displacement to cause flow over the proportional high pressure relief valve.

9. The system of claim 8 wherein the proportional high pressure relief valve is modulated to impact system pressure and braking torque to control the amount of braking provided to the system.

10. The system of claim 1 wherein the proportional high pressure relief valve regulates pressure such that there is no delay to achieve braking beyond the engine's available braking power once demanded by the speed control system.

\* \* \* \* \*